United States Patent
Carley et al.

(10) Patent No.: US 7,424,046 B2
(45) Date of Patent: Sep. 9, 2008

(54) SPREAD SPECTRUM CLOCK SIGNAL GENERATION SYSTEM AND METHOD

(75) Inventors: Adam L. Carley, Windham, NH (US); Daniel J. Allen, Derry, NH (US)

(73) Assignee: Altera Corporation, San Jose, CA (US)

( * ) Notice: Subject to any disclaimer, the term of this patent is extended or adjusted under 35 U.S.C. 154(b) by 330 days.

(21) Appl. No.: 10/964,777

(22) Filed: Oct. 15, 2004

(65) Prior Publication Data

US 2006/0083289 A1    Apr. 20, 2006

(51) Int. Cl.
H04B 1/00    (2006.01)

(52) U.S. Cl. .................. 375/130; 375/140; 375/141; 375/146; 375/147; 375/354; 375/355; 375/359; 375/360; 375/362; 375/364; 327/100; 327/141; 327/144; 327/162; 327/164; 327/170; 327/291

(58) Field of Classification Search .......... 375/130, 375/140, 141, 146, 147, 354, 355, 359, 360, 375/362, 364; 327/100, 141, 144, 162, 164, 327/165, 170, 291
See application file for complete search history.

(56) References Cited

U.S. PATENT DOCUMENTS

| | | | | |
|---|---|---|---|---|
| 4,005,364 A * | 1/1977 | Harrington | ........... | 324/76.59 |
| 4,641,102 A * | 2/1987 | Coulthart et al. | ........... | 327/164 |
| 5,103,466 A * | 4/1992 | Bazes | ........... | 375/361 |
| 5,130,717 A * | 7/1992 | Ewen et al. | ........... | 342/375 |
| 5,245,343 A * | 9/1993 | Greenwood et al. | ........... | 341/143 |
| 5,426,392 A * | 6/1995 | Kornfeld | ........... | 327/551 |
| 5,488,627 A | 1/1996 | Hardin et al. | | |
| 5,550,499 A * | 8/1996 | Eitrheim | ........... | 327/175 |
| 5,777,500 A * | 7/1998 | Eitrheim | ........... | 327/174 |
| 6,240,123 B1 * | 5/2001 | Zhang et al. | ........... | 375/130 |
| 6,501,307 B1 * | 12/2002 | Yen | ........... | 327/113 |
| 6,661,262 B1 * | 12/2003 | Curran | ........... | 327/116 |
| 6,664,832 B2 | 12/2003 | Carley | | |
| 6,687,319 B1 * | 2/2004 | Perino et al. | ........... | 375/367 |
| 6,697,416 B1 * | 2/2004 | Jennings | ........... | 375/130 |
| 6,909,311 B2 * | 6/2005 | Foley et al. | ........... | 327/141 |

(Continued)

Primary Examiner—Shuwang Liu
Assistant Examiner—Dhaval Patel
(74) Attorney, Agent, or Firm—Edell, Shapiro & Finnan, LLC (57) ABSTRACT

A system and method for generating a clock signal having spread spectrum modulation. The method involves generating a clock signal by generating edge positions for edges of the clock signal from a digital representation of a timing for each edge to impart spread spectrum modulation to the clock signal. A programmable modulator is provided that generates digital values representing edge positions for edges of a clock signal based on at least one of a time-varying period value and a time-varying duty-cycle value. The programmable modulator may comprise a first circuit, called a period modulation circuit, that generates a time-varying digital period value, and a second circuit, called a duty-cycle modulation circuit, that generates a time-varying digital duty-cycle value. The time-varying period values and time-varying duty cycle values are processed to produce a digital edge position value that specifies an edge position for a clock signal. The programmable modulator is coupled to an arbitrary waveform synthesizer that generates timing for edges of the clock signal based on the edge position values. A variety of modulations can be imposed on the clock signal using these techniques, including triangle wave modulation, near-triangle modulation, random and pseudo-random modulation.

47 Claims, 7 Drawing Sheets

U.S. PATENT DOCUMENTS

| | | | | |
|---|---|---|---|---|
| 2004/0001533 A1* | 1/2004 | Tran et al. | | 375/141 |
| 2004/0012428 A1* | 1/2004 | Yee et al. | | 327/175 |
| 2004/0085108 A1* | 5/2004 | Murata et al. | | 327/158 |
| 2005/0007168 A1* | 1/2005 | Park et al. | | 327/175 |
| 2005/0084021 A1 | 4/2005 | Egan et al. | | |
| 2005/0100080 A1 | 5/2005 | Egan et al. | | |
| 2005/0105590 A1 | 5/2005 | Egan et al. | | |
| 2005/0105591 A1 | 5/2005 | Egan | | |
| 2005/0105592 A1 | 5/2005 | Egan et al. | | |

* cited by examiner

SPREAD SPECTRUM CLOCK SIGNAL GENERATION SYSTEM AND METHOD

BACKGROUND OF THE INVENTION

This invention relates to the generation of clock signals where it is desirable to spread the spectrum of the clock signal to minimize radio frequency interference (RFI), or more generally referred to as electromagnetic interference (EMI).

Virtually all digital circuitry employs clocks. A clock is a repetitive waveform that synchronizes the flow of data through a circuit or parts of a circuit. Being a repetitive waveform and often driving many blocks of circuitry, the frequency of the clock tends to radiate from the circuit and cause interference to outside devices and to reception of RF signals, for example. Allowed limits for spurious radiation of this type are set by government and industry standards. RFI can also interfere with nearby circuitry in the same system, such as radio receivers.

A known technique called "spread spectrum clocking" ameliorates but does not eliminate this problem. Spread spectrum clocking modulates the clock frequency and thereby spreads the spurious power across a range of spectrum, reducing the effect at any one frequency. The total energy cannot be reduced by modulation because the amount of energy is fixed; it can only be spread.

Typically the clock frequency is modulated by a 50 KHz triangle wave over a range of −0.6% to +0.0% of the unmodulated frequency. The modulating frequency must be above the audio range to avoid interfering with audio systems through various modalities. Other than that, the spread spectrum modulating frequency is kept as low as possible because of the difficulty of generating the clock waveform with the conventional Phase-Locked-Loop (PLL) methods, and because the clock is often upconverted to a higher frequency clock by a second PLL that cannot follow rapid modulation.

Spread spectrum modulation is usually not allowed to generate instantaneous frequencies above the nominal frequency, hence the +0.0% limit. Generally, the nominal frequency is the highest frequency at which the clocked circuitry will operate reliably and cannot be exceeded. However, some small-amplitude spread spectrum modulation is symmetric about the nominal frequency, taking advantage of allowed error limits. The lower limit, e.g. −0.6%, is set as a compromise between spectral spreading and circuit performance. A −0.6% limit, for instance, results in a 0.3% loss of circuit speed.

A simple PLL cannot generate a spread spectrum clock. Instead analog techniques are used to "pull" the PLL back and forth around its locked condition. Numerous techniques are known in the art for various modulation waveforms and how to balance between spectral considerations and the practical considerations of PLL design. Waveforms close to triangular, but not exactly triangular, have been shown to be better than simple triangle waveforms. Nonetheless, simple triangle waveforms are most commonly used.

SUMMARY OF THE INVENTION

Briefly, a system and method are provided for generating a clock signal having spread spectrum modulation. The method involves generating a clock signal by generating edge positions for edges of the clock signal from a digital representation of a timing for each edge to impart spread spectrum modulation to the clock signal. A programmable modulator is provided that generates digital values representing edge positions for edges of a clock signal based on at least one of a time-varying period value and a time-varying duty-cycle value. The programmable modulator may comprise a first circuit, called a period modulation circuit, that generates a time-varying digital period value, and a second circuit, called a duty-cycle modulation circuit, that generates a time-varying digital duty-cycle value. The time-varying period values and time-varying duty cycle values are processed to produce a digital edge position value that specifies an edge position for a clock signal.

The programmable modulator is coupled to an arbitrary waveform synthesizer that generates timing for edges of the clock signal based on the edge position values. A variety of modulations can be imposed on the clock signal using these techniques, including triangle wave modulation, near-triangle modulation, random and pseudo-random modulation. Numerous other advantages are achieved with an all-digital approach to generating a spread spectrum modulation clock signal. Moreover, through these digital techniques, spread spectrum modulation may be applied to rising ("primary") edges and falling ("secondary") edges independently. For example, in some applications, it may be advantageous to impart modulation on secondary edges whereas no modulation is imparted on primary edges.

Objects and advantages of the systems and methods described herein will become more readily apparent when reference is made to the following description taken in conjunction with the accompanying drawings.

DETAILED DESCRIPTION

Figure 1:
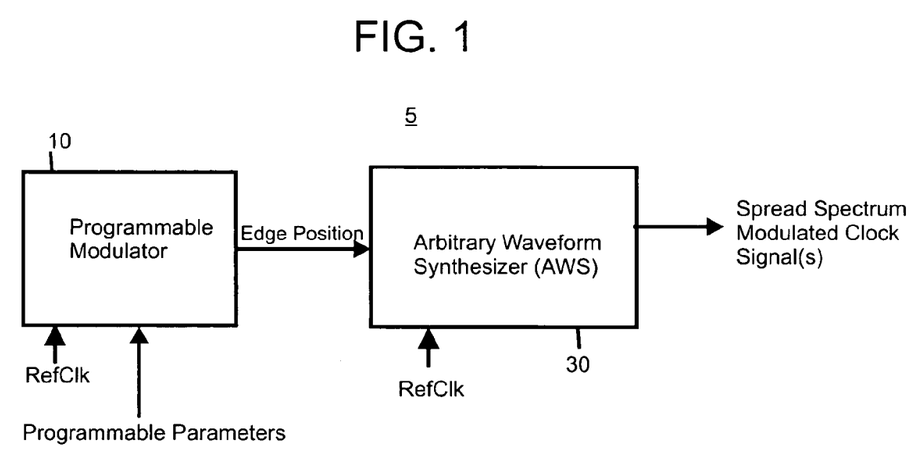
FIG. 1 is a block diagram of a clock generation system comprising a programmable modulator circuit and a arbitrary waveform synthesizer.

FIG. 1 shows a clock generation system 5 comprising a programmable modulator 10 and an arbitrary waveform synthesizer 30. The programmable modulator 10 generates a digital value that describes an edge position of a clock signal. The arbitrary waveform synthesizer (AWS) 30 takes the digital edge position value and produces the actual edge of the clock signal after a latency of (typically) a few output clock cycles. The AWS 30 is a digital circuit that is driven by a reference clock and allows the specification of each edge, rising and/or falling, in an output waveform as a binary number representing the desired time of the edge. An example of an AWS is disclosed in commonly assigned U.S. Pat. Nos. 6,377,094 and 6,664,832, the entirety of each of which is incorporated by reference.

The programmable modulator 10 generates the digital edge position value so as to impart spread spectrum modulation on a clock signal (Clk) generated by the arbitrary waveform synthesizer 30. The output clock signal Clk is also referred to as channel clock (ChClk) hereinafter. The programmable modulator 10 performs various digital calculations to impart modulation on the period and/or duty cycle of the resulting clock signal(s) output by the AWS 30. The spacing of edges can vary from one clock period to the next as can the duty cycle of the signal, producing a truly arbitrary clock waveform, or adjacent clock periods may be constrained to vary only slightly. Like the AWS 30, the programmable modulator 10 may be driven by a reference clock (RefClk).

Figure 2:
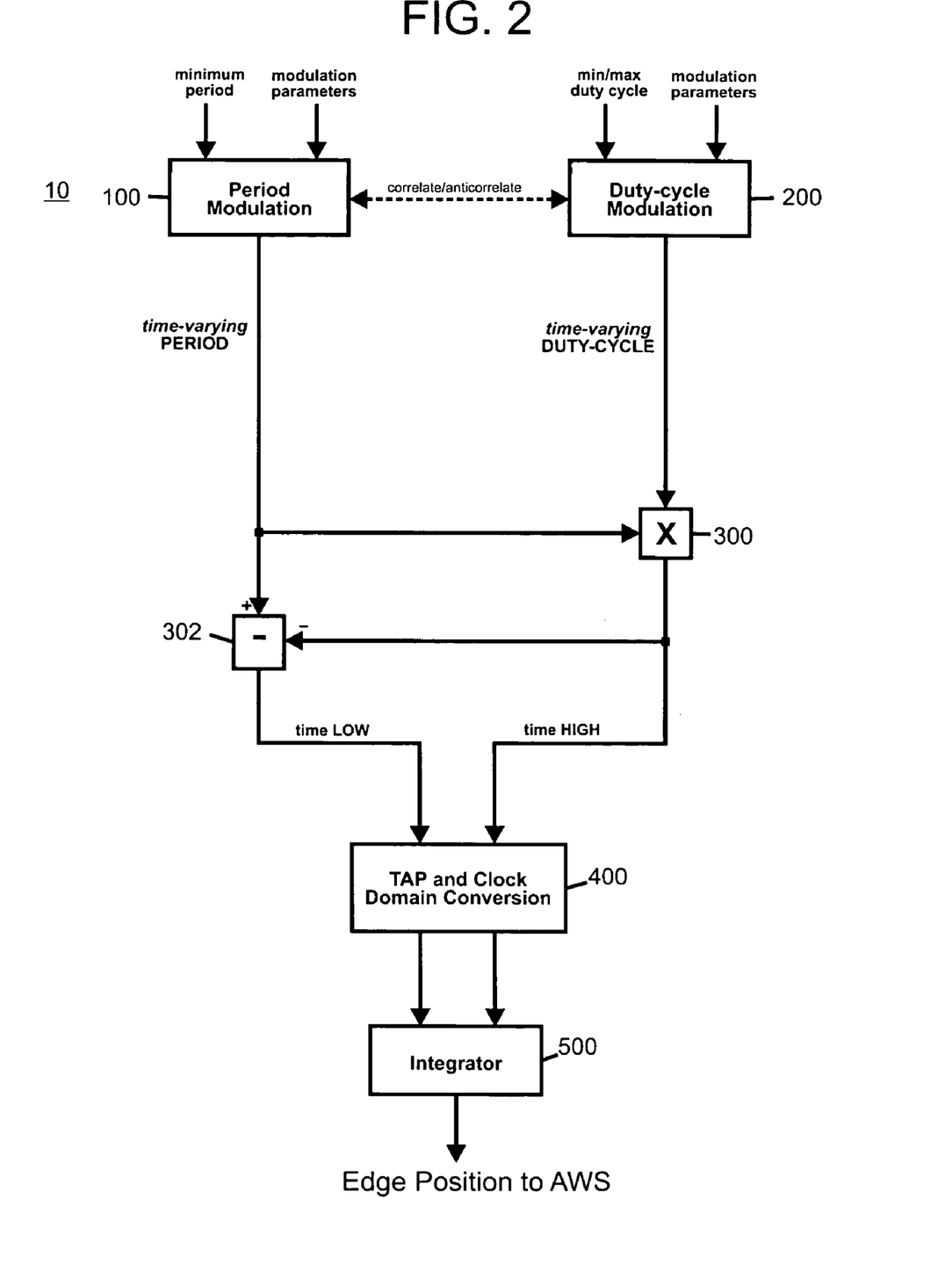
FIG. 2 is a block diagram of the programmable modulator circuit.

Turning to FIG. 2, the programmable modulator 10 comprises a period modulation circuit or block 100 and a duty cycle modulation circuit or block 200. These blocks are described in greater detail hereinafter in connection with FIGS. 3 and 4. The period modulation block 100 outputs a digital value (e.g., binary number) representing a time-varying PERIOD of a clock signal (in units of RefClk) based on programmable modulation parameters and a minimum period value. The period modulation block 100 may generate triangle, random, etc., spread-spectrum modulation, or no modulation. An important constraint may be the minimum period that is allowed and that modulation parameter is explicitly called out. The time-varying PERIOD refers to rising edge to rising edge. The falling edge to falling edge period may be different.

Similarly, the duty-cycle modulation block 200 produces a digital value representing a time-varying DUTY-CYCLE. The duty cycle is the percentage of a given cycle where the output clock is to be high. The clock is low 100% minus the % of time that it is high. Falling edge modulation begins as duty-cycle modulation because in a practical system there are severe constraints on duty cycle. Both the time-varying PERIOD and time-varying DUTY-CYCLE are updated each RefClk cycle, and may take on different values from clock cycle to clock cycle.

Clocks have a duty-cycle specification. For example, 45-55% or 40-60% would be typical values. Obviously this severely limits where the falling edge may be placed in a given cycle. Such tight limits, e.g., 45-55%, are more for engineering convenience than necessity. Systems will operate over much broader spans, e.g. 30-70%, if care is taken in their clock paths. Nevertheless, the allowed duty-cycle range is a major constraint that is input to or hard-wired in this block (e.g., min/max duty cycle). Beyond that, the same modulation parameters are possible for duty-cycle modulation as for period modulation.

The duty-cycle modulation can be independent of the period modulation or deliberately correlated or anti-correlated with it as desired. There may be no period modulation. The output of the duty-cycle modulator is a digital value (e.g., a binary number) representing the percent (fraction) of the period that the clock is to be HIGH.

A multiplier block 300 and subtraction block 302 are coupled to the outputs of the period modulation block 100 and the duty-cycle modulation block 200. These blocks convert the PERIOD and DUTY-CYCLE numbers into actual times for high (time HIGH) and low (time LOW) portions of the clock signal, in reference units of RefClk period.

A TAP conversion and Clock Domain Adjustment circuit 400 is coupled to receive as inputs the time LOW and time HIGH values. This circuit 400 converts these numbers from the domain of RefClk into units of the delay line tap spacing in the AWS 30. This requires multiplying these numbers by a measured average loop speed if the AWS 30 taps the delay elements of a free-running loop, or a predetermined locked speed if the AWS 30 taps the delay elements of a locked loop. The conversion to TAP units may be done where shown, after the final block, or earlier in the chain of processing before the arithmetic blocks 300 and 302, depending on desired output clock frequency and other engineering considerations. For a locked system, TAP units may be used throughout (in the period modulation block 100 and duty-cycle modulation block 200) so that no conversion is necessary.

The AWS 30 requires input data synchronized with its own output clock, called ChClk. That clock signal may be too fast or inconvenient for the operations in the period modulation block 100 and duty-cycle modulation block 200, and as a result RefClk is used there. The block 400 passes data from one clock domain to the other with minimum latency. The function of converting from one clock domain to another is described in the aforementioned U.S. patents.

The integrator circuit 500 computes the next edge position based on the converted time LOW and time HIGH numbers. The integrator circuit 500 integrates these numbers as follows. The time HIGH number is added to the previous rising-edge position to produce the new falling-edge position. Conversely, the time LOW number is added to the previous falling-edge position to produce the new rising-edge position.

The rising and falling edges may be handled by different "channels" in the AWS 30 for speed considerations. In that case the subtraction block 302 would be omitted and only the PERIOD is integrated for the rising-edge calculation. The falling-edge positions would be computed as increments off the rising-edge positions.

Figure 3:
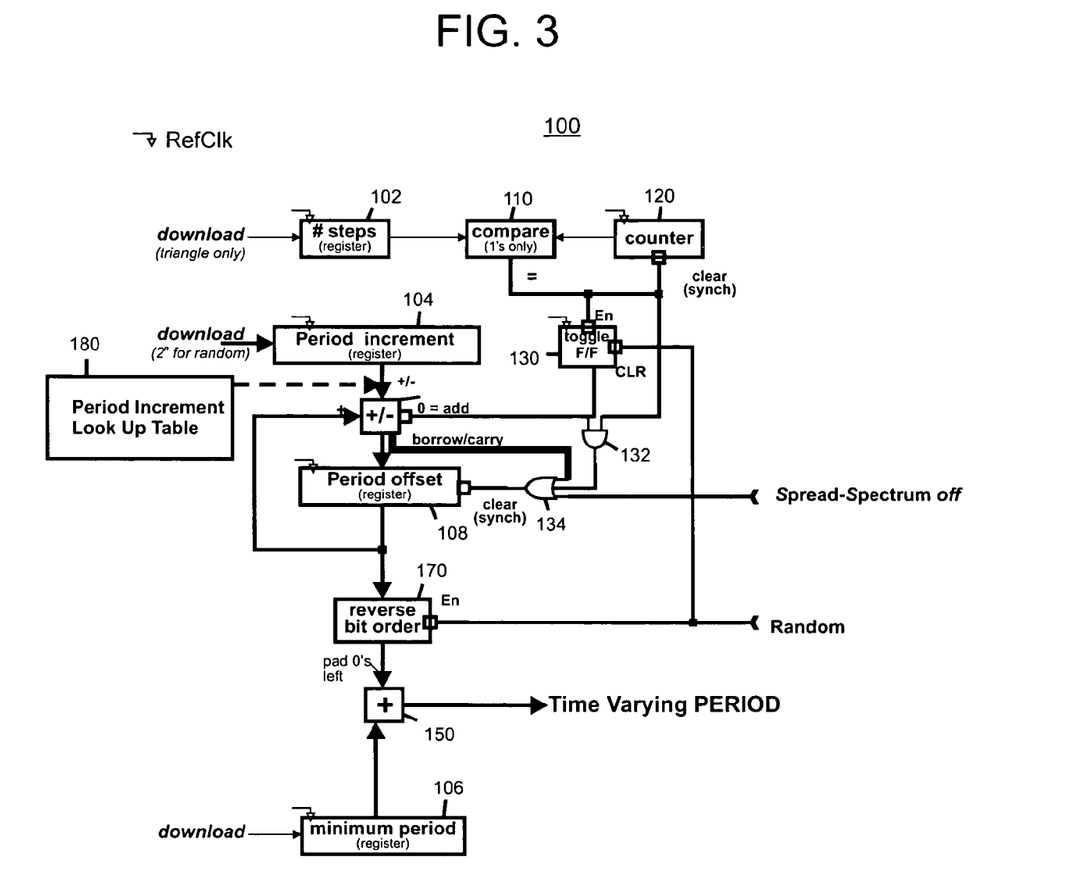
FIG. 3 is a block diagram of a period modulation circuit forming a port of the programming modulator circuit.

Turning to FIG. 3, the period modulation block 100 is described in greater detail. In this example, all circuitry of the period modulation block 100 is clocked by RefClk. The period modulation block 100 generates either triangle or (pseudo-) random spread spectrum modulation depending on the control bit "Spread Spectrum Off", an input from a host device (e.g., a processor). The programmability of the period modulator results from the ability to download from a host device a variety of parameters that control the characteristics of modulation imparted to the resulting clock signal(s) output by the arbitrary waveform synthesizer. These parameters are downloaded into registers. For example, the # steps register 102 stores the number of steps (# steps) and the period increment register 104 stores the Period Increment. These two registers determine characteristics of a triangle wave modulation, in particular the duration and slope of each side of the resulting triangle pattern. Number of steps (# steps) is the number of output periods in each leg of the triangle wave, and is an integer. Period Increment is the amount the output period is incremented, up or down, from the previous output period. The minimum period register 106 stores a downloaded value for the Minimum Period. All downloaded constants may have valid default values that enable the circuit to begin functioning immediately, before any downloading takes place. This is important if the clock signal is needed for correct system operation and integrity. The Minimum Period value sets and limits the maximum frequency of the clock signal. Because it is a downloadable constant, it can be changed or reprogrammed, the advantages of which are described hereinafter.

The period modulation block 100 further comprises a comparator 110, a counter 120, a toggle flip flop (FF) 130, an AND gate 132, an OR gate 134, an adder 140, an adder 150 and a edge position register 160 that stores an Edge Position value. The comparator 110 is coupled between the register 102 and the counter 120, and compares the values from these blocks and to produce an output that is coupled to enable (En) input of the toggle FF 130. The output of the toggle FF 130 is coupled to one input of the AND gate 132, and to an input of the adder 140. A clear (sync) signal is coupled to the other input of the AND gate 132. The output of the AND gate 132 is coupled to one input of the OR gate 134. A borrow/carry output of the adder 140 is coupled to another input of the OR gate 134. The Spread Spectrum Off signal is coupled to the final input of the OR gate 134. The content of the period increment register 104 is coupled to one input of the adder 140 and the Period Offset value computed by the adder 140 is coupled to a period offset register 108. The reverse bit order counter 170 is optional and invoked in response to the control bit, Random, when random modulation is desired, as described hereinafter. When random modulation is not invoked, the content of the register 108 is coupled to the adder 150.

The adder 150 outputs a time varying PERIOD as the sum of the Minimum Period and the Period Offset. Specifically, the adder 140 increments, up or down, a Period Offset value by an amount equal to Period Increment, and writes the result into the period offset register 108. The period offset value is then coupled to the adder 150 to add the period offset value to the Minimum Period value.

The comparator 110 compares the # Steps value stored in register # steps register 102 with the current cont value of counter 120 and generates a signal that is coupled to the En input of the toggle FF 130 when the counter value equals the # Steps value. When the output of the toggle FF 130 goes high, the adder 140 decrements the period offset by the Period Increment amount (otherwise it is in increment mode). The adder 140 switches between incrementing and decrementing the Period Increment value according to the # Steps value. The output of the period modulation block 100 is the time-varying PERIOD as referred to above in FIG. 2.

Figure 4:
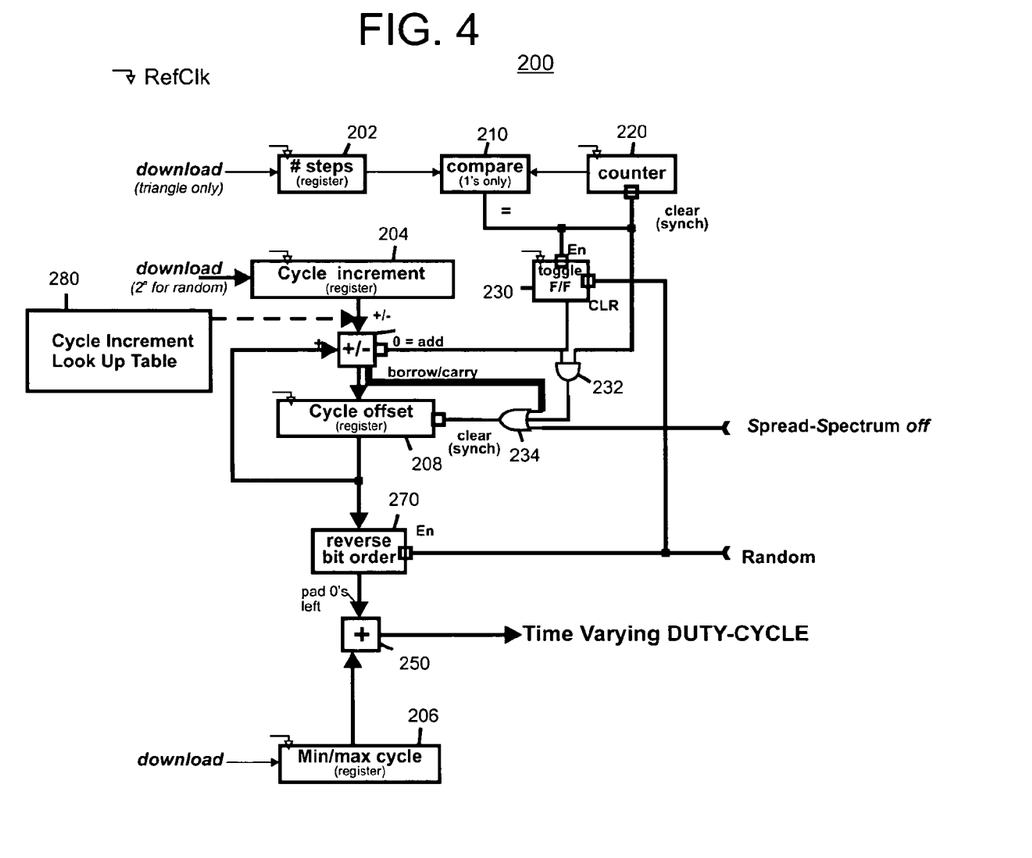
FIG. 4 is a block diagram of a duty-cycle modulation circuit forming a part of the programmable modulator circuit.

FIG. 4 shows the duty-cycle modulation block 200. It is similar to the period modulation block 100, except that it produces a time varying DUTY-CYCLE value.

The # steps register 202 stores the number of steps (# steps) and the cycle increment register 104 stores the Cycle Increment. These two registers determine characteristics of a triangle wave modulation, in particular the duration and slope of each side of the resulting triangle pattern. Cycle Increment is the amount the output duty cycle is incremented, up or down, from the previous duty cycle. The min/max cycle register 106 stores downloaded values for the minimum and maximum duty cycle (e.g., permissible duty cycle range).

The duty-cycle modulation block 200 further comprises a comparator 210, a counter 220, a toggle flip flop (FF) 230, an AND gate 232, an OR gate 234, an adder 240, an adder 250. The comparator 210 is coupled between the register 202 and the counter 220, and compares the values from these blocks and to produce an output that is coupled to enable (En) input of the toggle FF 230. The output of the toggle FF 230 is coupled to one input of the AND gate 232, and to an input of the adder 240. A clear (sync) signal is coupled to the other input of the AND gate 232. The output of the AND gate 232 is coupled to one input of the OR gate 234. A borrow/carry output of the adder 240 is coupled to another input of the OR gate 234. The Spread Spectrum Off signal is coupled to the final input of the OR gate 234. The content of the period increment register 204 is coupled to one input of the adder 240 and the Period Offset value computed by the adder 240 is coupled to a period offset register 208. The reverse bit order counter 270 is optional and invoked in response to the control bit, Random, when random modulation is desired, as described hereinafter. When random modulation is not invoked, the content of the register 208 is coupled to the adder 250.

The adder 250 outputs a time varying DUTY CYCLE as an offset from the minimum or maximum duty cycle. Specifically, the adder 140 increments, up or down, a Cycle Offset value by an amount equal to Cycle Increment, and writes the result into the cycle offset register 108. The cycle offset value is then coupled to the adder 150 to add the cycle offset value to the minimum duty cycle value, or subtract the cycle offset value from the maximum duty cycle value.

As shown by FIGS. 3 and 4, a variety of modulation types can be selectively imposed on both the time-varying PERIOD and time-varying DUTY-CYCLE. These properties carry forward into the edge position value produced therefrom and used as a control parameter in the AWS 30.

Figure 5:
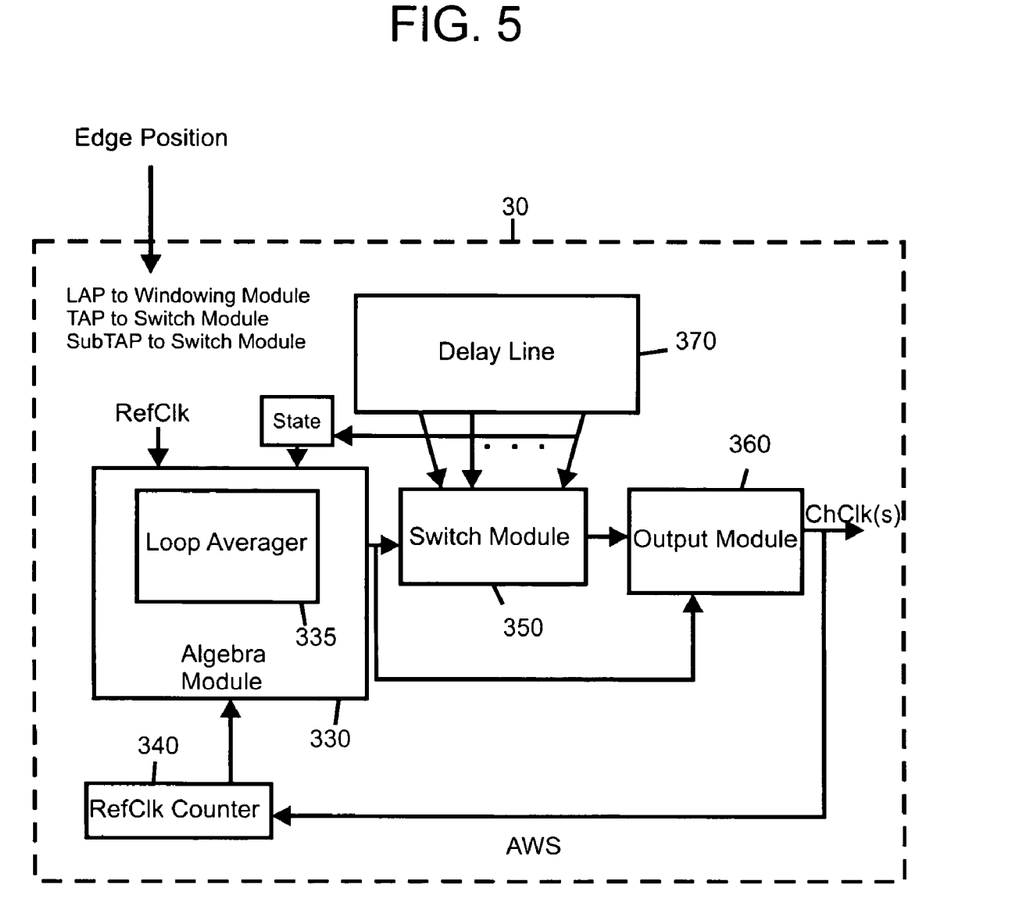
FIG. 5 is a block diagram of a arbitrary waveform synthesizer.

FIG. 5 shows the AWS 30. The AWS 30 is an arbitrary waveform synthesizer disclosed in the aforementioned commonly assigned U.S. patents, the entirety of each of which is incorporated herein by reference. The AWS 30 comprises an algebra module 330 including a loop averager module 335, a reference clock (RefClk) counter 340, a switch module 350, and an output module 360. The switch module 350 couples to select an edge from one of a plurality of delay elements in a delay line 370. The delay line 370 may be part of a phase locked loop (PLL), a delay locked loop (DLL) or a free-running oscillator.

In the AWS 30, the edge position value output by the programmable modulator 10 is converted to: (a) a LAP value that is supplied to a windowing function in the output module 360; (b) a TAP value that is supplied to the switch module; and (c) a subTAP value that is also supplied to the switch module.

The algebra module 330 includes a loop averaging module 335 that counts the number of tap transitions (in the delay line 370) occurring between edges of the reference clock signal and calculates an average loop speed in response to the count. The loop averager module 335 can further calculate the instantaneous phase in response to the calculated average loop speed and a plurality of captured states of the loop. The algebra module 330 includes an algebra data input port, a clock input port and an algebra data output port. The algebra module 330 generates a signal at the algebra data output port indicating a first rising edge of the arbitrary waveform in response to a signal received at the algebra data input port.

The switch module 350 includes a switch input port in electrical communication with the algebra data output port, a plurality of switch tap input ports in electrical communication with the oscillator taps and switch output port. At the switch output port, the switch module provides a first transition signal selected from one of the plurality of oscillator taps in response to the signal indicative of a first rising edge received at the switch input port.

The output module 360 includes a transition signal input port in electrical communication with the switch output port, a window input port in electrical communication with the algebra data output port and a waveform output port in electrical communication with the clock input port of the algebra module. The output module 360 creates an arbitrary waveform at the waveform output port in response to the first transition signal received at the transition signal input port of the output module and the signal of a first rising edge received at the window input port. The AWS 30 generates a desired spread spectrum modulation on the output clock signal, ChClk based on the digital edge position value supplied to it.

The spread spectrum modulation is imparted to the clock signal ChClk because the digital edge position value is based on a time-varying period value and/or a time-varying duty cycle value. If the AWS 30 has logic to generate multiple channels, then the digital edge position value would be split into additional instances, and for each channel instance in the AWS 30, the edge position value would be converted to LAP data, TAP data and subTAP data.

Furthermore, as described in the aforementioned commonly assigned patents, the AWS 30 have multiple dedicate algebra modules and other supporting modules to generate multiple clock signals, either correlated or not correlated to each other. Using the programmable modulator 10, spread spectrum modulation may be imposed differently on each these multiple clock signals.

As suggested herein, the delay line 370 may be part of a free-running oscillator, a PLL or a DLL. In the case of a PLL or DLL, the PLL or DLL output may be locked to the reference clock, or to the spread spectrum output clock.

Thus, to summarize, the method for generating a clock signal having spread spectrum modulation comprises generating edge position values for edges of the clock signal based on at least one of a time-varying digital period value and a time-varying duty-cycle value. Edges of the clock signal are generated based on the edge position values so as to impart spread spectrum modulation to the clock signal.

The terms "rising edge" and "falling edge" are hereinafter replaced with the more generalized terms "primary edge" and "secondary edge", respectively.

Triangle Modulation

As described above in connection with FIG. 2, the programmable modulator 10 generates an edge position value so as to impart triangle wave modulation to the primary edge and/or secondary edge according to the parameters that are programmable as described above in conjunction with FIGS. 3 and 4.

Near-Triangle Modulation

Triangle modulation is generally considered adequate for practical spread spectrum clocking. However, it has been shown that improved results are possible by deviating from an ideal triangle wave. U.S. Pat. No. 5,488,627 describes examples of such waveforms. The all-digital input format of the arbitrary waveform synthesizer 30 makes it ideal for such more complex modulation waveforms.

Generating such modulation waveforms requires a lookup table and/or computations more complex than those shown in FIGS. 3 and/or 4. For example, the period increment register 104 in FIG. 3 may be replaced by a complete lookup table 180 of Period Increments, one for each step of the triangle. The up/down counter mechanism would then add a different period increment for each step, instead of a fixed value from the register 104. Similarly, the cycle increment register 204 in FIG. 4 may be replaced by a complete lookup table 280 of Cycle Increments, one for each step of the triangle.

Space in the lookup table may be conserved by various means well known in the art. For example, each entry could be used two or more times instead of just once. If interpolation is used instead of simple repetition, a relatively smooth piecewise linear approximation is achieved.

The circuits shown in FIGS. 3 and 4 can also be modified to add a cubic term to the linear computations shown. This approximately doubles the silicon area but requires no lookup table and achieves most of the benefit of a table. The (normalized) formula from U.S. Pat. No. 5,488,627, for one quadrant, is $$M(t)=0.45t^3+0.55t\, 0\leq t\leq 1$$

Random and Pseudo-Random Modulation

Prior art spread spectrum clock generation has almost-universally used a PLL as its oscillatory source. PLLs have finite loop bandwidth and hence cannot change frequency instantaneously. The triangle and near-triangle modulation waveforms discussed above have no discontinuities, and this allows them to be generated by a PLL. In contrast, the digital synthesizer described herein can change frequency instantaneously. The clock period and duty cycle can change an arbitrarily large amount from one cycle to the next. This creates the possibility of random frequency hopping for spread spectrum purposes.

Random frequency hopping can create a frequency spectrum without the periodic artifacts seen in triangle or near-triangle modulation. Pseudo-random number generators are well known and come in varying levels of sophistication. An example of a pseudo-random number generator shown in FIGS. 3 and 4 is reverse bit order binary counter 170 (270). The counter 170 (270) repeats its pattern every $2^n$ cycles where n is the number of bits being reversed. The pattern starts begins: 0%, 50%, 25%, 75%, 12%, 62%, 37%, 87%, etc. One with ordinary skill in the art will appreciate that a wide range of other pseudo-random generators that do not repeat (e.g., are actually random) and may be employed in place of the reverse bit order counter 170 (270) in order to create any desired spectrum in the period and/or duty-cycle.

Very Rapid Modulation

Prior art spread spectrum modulation is designed to modulate the frequency slowly enough that a downstream PLL can easily lock to it. While this criterion will continue to apply to many situations, the techniques described herein create the useful possibility of doing the reverse, deliberately modulating the frequency so fast that the downstream PLL cannot follow and instead locks to the average frequency. That is, the modulator circuit generates the edge positions such that the resulting spread spectrum modulation of the clock signal varies rapidly around an average frequency of the clock signal.

The advantage of such very rapid modulation is that the faster modulation will spread the spectrum better and furthermore that larger frequency swings are possible without degrading performance. Such larger swings also result in better spreading of spectral energy.

A given digital circuit has a maximum clock frequency at which it will operate reliably. Alternatively put, it has a minimum clock cycle time. Going below that, for even a single cycle, can result in a type of failure called a "setup violation." It is important that a spread spectrum clock be precisely limited in its maximum frequency.

Peak Frequency Control

Spread spectrum clocking generated by PLLs has imperfect control of its maximum frequency since the PLL is only approximately locked. Careful analog design and high accuracies are used to control maximum frequency.

Using the digital techniques described herein, the maximum frequency (or more precisely, the minimum period) is defined by a binary number of high precision, e.g., 19-24 bits, which relates directly to the incoming crystal time reference. There is no error from this source using the digital circuits shown in FIG. 3. Hence, the maximum frequency can be set at its limit without leaving any additional guard band for PLL inaccuracy. Furthermore, this maximum frequency is easily, precisely, and seamlessly changeable under software or other digital control. The peak frequency may be tweaked based on criteria that could only be dealt with on a worst-case basis before, for example temperature.

In the context of the system described herein, peak or maximum clock signal frequency is set or limited by the Minimum Period value stored in minimum period register 106. The Minimum Period value can be changed or reprogrammed by a host device to thereby change the allowable maximum frequency of the clock signal.

An important option with peak frequency control is drive-to-failure. The digital circuit being clocked is driven to successively higher peak frequencies until a failure occurs. This process, which can be entirely automatic, locates the exact failure point and can result in as much as 15% to 20% additional performance in a given circuit.

Modulating Primary and Secondary Clock Edges Independently

Most digital logic utilizes only a single edge of the clock waveform, the rising edge, which is referred to herein as the "primary edge". It is considered poor engineering practice to use the falling edge, referred to herein as the "secondary edge". That is because the time-relationship between primary and secondary edges varies as the clock passes through amplifiers and other circuitry and is not predictable.

However, primary and secondary clock edges contribute equally to the radio-frequency interference (RFI) that spread spectrum clocking is designed to ameliorate. Therefore it makes sense for the spread spectrum clock generator to modulate the secondary edge either more vigorously, or even exclusively. For example, while the primary-edge to primary-edge cycle cannot violate the peak frequency specification, the secondary-edge to secondary-edge cycle has no such constraint.

The techniques described herein can easily be employed to modulate the primary and secondary edges independently, whereas there is no practical way for a PLL spread spectrum generator to do this. The advantage of this degree of freedom is far greater than the near-triangle vs. triangle modulation advantage.

The duty cycle of the generated clock is usually a system specification, e.g., 45% to 55%. Most driven circuits tolerate a much larger range. A larger range tolerance enables a greater degree of preferential secondary-edge spread spectrum modulation, by modulating the duty cycle with the duty cycle modulation block 200 in the same manner that the period is modulated by the period modulation block 100. For example, a constraint may be relaxed to allow a 35% to 65% range. Regardless of the range tolerance, the additional falling-edge modulation will meet the constraint, and in so doing, the modulation becomes a phase modulation, not a frequency modulation.

Figure 6:
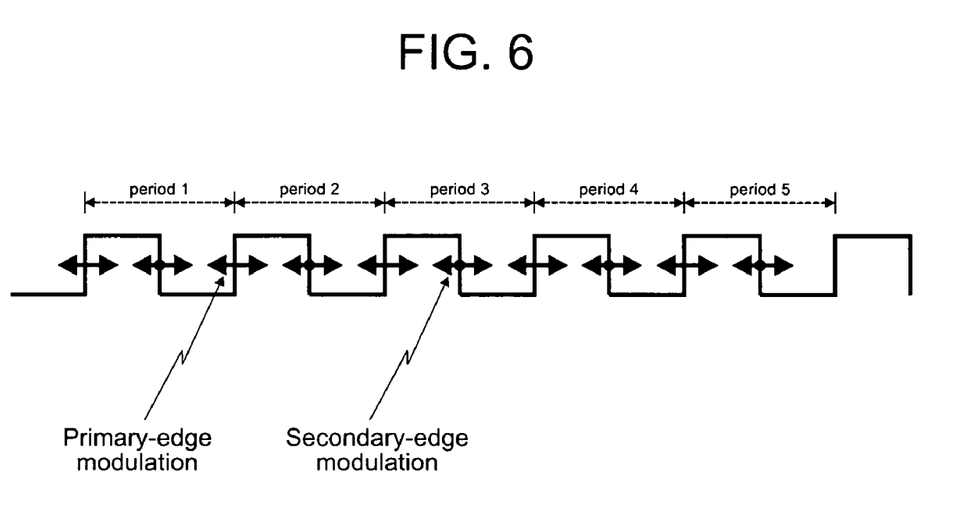
FIG. 6 is a diagram showing a spread spectrum modulation independently applied to primary and secondary edges of a clock signal.

FIG. 6 shows that the primary edges and secondary edges of a clock signal produced by the AWS may be modulated separate an independently from each other using the programmable modulator 10 described herein. There may be (a) primary edge modulation with no secondary edge modulation; or (b) secondary edge modulation with no primary edge modulation; or (b) no modulation of both the primary edges and secondary edges.

Furthermore, the duty-cycle modulation block 200 in the programmable modulator 10 and arbitrary waveform synthesizer 30 may cooperate to generate the timing for secondary edges such that the secondary edges are placed or occur in an adjustable range between adjacent rising edges. For example, the secondary edges may be placed midway between adjacent rising edges.

Figure 7:
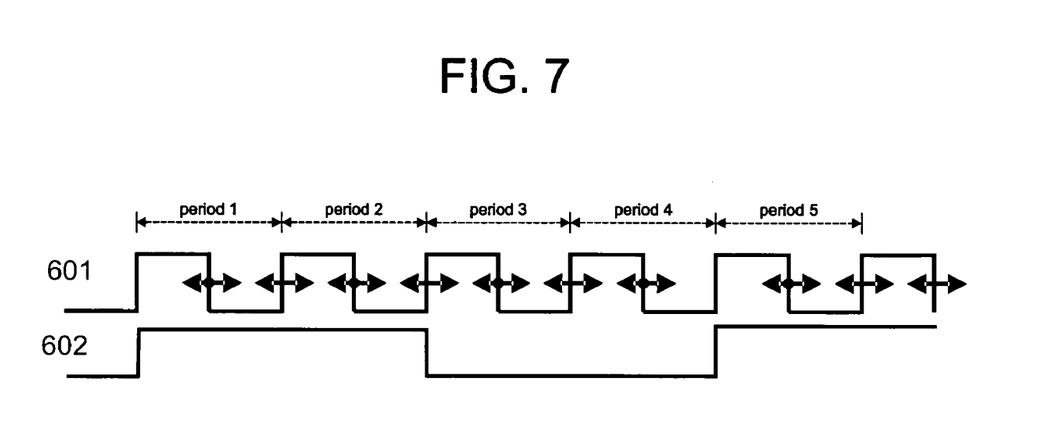
FIG. 7 is a diagram showing two clock signals produced by the system that are spread spectrum modulated differently.

FIG. 7 shows still another application where multiple clock signals are generated by the system shown in FIG. 1, each with a different type or degree of spread spectrum modulation. In the example shown, there are first and second clock signals 601 and 602, respectively. Clock signal 601 has a greater frequency than clock signal 602, and the first and second clock signals are correlated to each other in the sense that every second rising edge of clock signal 601 coincides with an edge (rising or falling) of clock signal 602. In addition, the programmable modulator 10 is configured to impose spread spectrum modulation on clock signal 601 only for those edges (rising and/or falling) that occur between successive rising (or falling) edges (one full period) of clock signal 602. The rising edges of clock signal 601 that coincide with the rising edges of clock signal 602 are not spread spectrum modulated. This scenario may be extended to a system with more than two clock signals that are used to drive various components on a system. Moreover, while FIG. 7 shows the application where the rising edges of clock signal 602 are "protected" insofar as the coinciding edges of clock signal 601 are not modulated, the same can be applied to the falling edges of clock signal 602. It is possible that the falling edge of the clock signal 601 may be spread spectrum modulated. In addition, the first and second clock signals 601 and 602 may be uncorrelated, but still spread spectrum modulated differently. FIG. 7 also shows an example where spread spectrum modulation is imposed on some but not all edges of a clock signal, and this may apply when the system 5 generates a single or multiple clock signals.

The scenario shown in FIG. 7 is useful in a system where an event that coincides with rising (or falling) edges of two clock signals is such that spread spectrum modulation should not be imposed for that event. For example, clock signal 601 may be a CPU clock signal and clock signal 602 may be a memory transfer clock signal in a computer system. In this application, the clock signals are correlated, but at different frequencies. Furthermore, where a memory transfer operation may occur on the rising edges of clock signal 602, it is desirable not to perform spread spectrum modulation on the coinciding edges of clock signal 601.

Thus, FIG. 7 shows that the system 5 may output two or more clock signals (e.g., first and second clock signals) that are correlated and are spread spectrum modulated differently.

To summarize, a method is provided for generating a clock signal comprising generating edge positions for edges of the clock signal from a digital representation of a timing for each edge to impart spread spectrum modulation to the clock signal. More specifically stated, a method is provided for generating a clock signal having spread spectrum modulation comprising generating at least one of a time-varying digital period value and a time-varying digital duty cycle value, and generating digital edge position values that specify edges of the clock signal based on at least one of the time-varying digital clock period value and the time-varying digital duty cycle value.

Similarly, a system is provided for generating a clock signal having spread spectrum modulation, comprising a modulator circuit that generates digital edge position values representing edge positions of a clock signal, and an arbitrary waveform synthesizer coupled to the modulator circuit that, based on the digital edge position values, generates edges of the clock signal as a digital representation of a timing of each edge so as to impart spread spectrum modulation to the clock signal.

The modulator circuit may broadly be stated to comprise a first circuit that generates a time-varying digital period value; a second circuit that generates a time-varying digital duty-cycle value; an integrator circuit coupled to the first and second circuits, wherein the integrator circuit outputs a digital edge position values based at least one of the time-varying digital period value and the time-varying digital duty-cycle value, wherein the digital edge position values represent edge positions of a clock signal.

In addition, a method is provided for generating a clock signal having primary and secondary edges, comprising generating primary and secondary edges of the clock so as to impart spread spectrum modulation to the secondary edges independently of any spread spectrum modulation imparted to the primary edges.

Furthermore, a method is provided for generating a clock signal comprising generating edges of the clock signal so as to impart a random or pseudo-random modulation on edges of the clock signal.

The system and methods described herein may be embodied in other specific forms without departing from the spirit or essential characteristics thereof. The foregoing embodiments are therefore to be considered in all respects illustrative and not meant to be limiting.

What is claimed is:

1. A method for generating a clock signal having desired spectral characteristics, comprising:
    generating digital edge position values that specify desired timing of primary edges of the clock signal to impart spread spectrum modulation to the clock signal such that resulting primary-edge to primary-edge periods of the clock signal form a triangle pattern when plotted against time;
    receiving parameters to adjust a shape of the triangle pattern including values representing a duration and a slope of the triangle pattern; and
    supplying the digital edge position values to a waveform generation circuit having a digital input and which is driven by a reference clock, wherein said waveform generation circuit allows specification of each edge in an output waveform as a digital value supplied to said digital input that represents desired timing of each edge, wherein the output waveform produced by the waveform generation circuit is based on the digital edge position values and is the clock signal that exhibits the desired spectral characteristics.

2. The method of claim 1, wherein generating comprises generating a time-varying digital period value that specifies a period of time of a next edge relative to a previous edge of the clock signal, and wherein generating the digital edge position values is based on the time-varying digital period value.

3. The method of claim 2, wherein generating comprises generating the time-varying digital period value in units proportional to a period of a reference clock.

4. The method of claim 2, wherein generating comprises generating the time-varying digital period value that varies according to a pseudo-random pattern.

5. The method of claim 4, wherein generating comprises generating the time-varying digital period value that varies to impart a desired frequency spectrum in the clock signal.

6. The method of claim 2, wherein generating comprises generating the time-varying digital period value that varies according to a random pattern.

7. The method of claim 2, wherein generating comprises generating a time-varying digital duty cycle value, and wherein generating the digital edge position values is based on one or both of the time-varying digital period value and the time-varying digital duty cycle value.

8. A method for generating a clock signal having desired spectral characteristics, comprising:
    generating digital edge position values that specify desired timing of primary edges of the clock signal to impart spread spectrum modulation to the clock signal such that resulting primary-edge to primary-edge periods of the clock signal form a triangle pattern when plotted against time, wherein generating comprises generating each primary edge of the clock signal according to the formula $M(t)=0.45t^3+0.55t$, $0 \leq t \leq 1$; and
    supplying the digital edge position values to a waveform generation circuit having a digital input and which is driven by a reference clock, wherein said waveform generation circuit allows specification of each edge in an output waveform as a digital value supplied to said digital input that represents desired timing of each edge, wherein the output waveform produced by the waveform generation circuit is based on the digital edge position values and is the clock signal that exhibits the desired spectral characteristics.

9. A method for generating a clock signal having desired spectral characteristics, comprising:
    generating digital edge position values that specify desired timing of edges of the clock signal to impart spread spectrum modulation to the clock signal, wherein the digital edge position values are based on time-varying digital period values that specify a period of time of a next edge relative to a previous edge of the clock signal; and
    supplying the digital edge position values to a waveform generation circuit having a digital input and which is driven by a reference clock, wherein said waveform generation circuit allows specification of each edge in an output waveform as a digital value supplied to said digital input that represents desired timing of each edge, wherein the output waveform produced by the waveform generation circuit is based on the digital edge position values and is the clock signal that exhibits the desired spectral characteristics;
    wherein generating comprises generating the time-varying digital period values such that the resulting spread spectrum modulation of the clock signal varies rapidly around an average frequency of the clock signal.

10. The method of claim 9, and further comprising setting a minimum value for the time-varying digital period value so as to control a maximum frequency of the clock signal.

11. The method of claim 10, and further comprising changing the minimum value for the time-varying digital period value.

12. A method for generating a clock signal having desired spectral characteristics, comprising:
    generating digital edge position values that specify desired timing of edges of the clock signal to impart spread spectrum modulation to the clock signal, wherein the digital edge position values are based on time-varying digital period values that specify a period of time of a next edge relative to a previous edge of the clock signal and time-varying digital duty cycle values; and
    supplying the digital edge position values to a waveform generation circuit having a digital input and which is driven by a reference clock, wherein said waveform generation circuit allows specification of each edge in an output waveform as a digital value supplied to said digital input that represents desired timing of each edge, wherein the output waveform produced by the waveform generation circuit is based on the digital edge position values and is the clock signal that exhibits the desired spectral characteristics;
    wherein generating comprises generating the time-varying digital period values and the time-varying digital duty cycle values to impart a desired frequency spectrum in the clock signal.

13. A method for generating a clock signal having desired spectral characteristics, comprising:
    generating digital edge position values that specify desired timing of edges of the clock signal to impart spread spectrum modulation to the clock signal based on one or both of time-varying digital period values that specify a period of time of a next edge relative to a previous edge of the clock signal and time-varying digital duty cycle values; and supplying the digital edge position values to a waveform generation circuit having a digital input and which is driven by a reference clock, wherein said waveform generation circuit allows specification of each edge in an output waveform as a digital value supplied to said digital input that represents desired timing of each edge, wherein the output waveform produced by the waveform generation circuit is based on the digital edge position values and is the clock signal that exhibits the desired spectral characteristics;

wherein generating comprises generating the time-varying digital period values that vary according to a pseudo-random pattern and the time-varying digital duty cycle values that vary according to the pseudo random pattern.

14. A method for generating a clock signal having desired spectral characteristics, comprising:

generating time-varying digital period values that specify a period of time of a next edge relative to a previous edge of the clock signal and time-varying duty cycle values and correlating the generation of the time-varying digital period values and the time-varying digital duty cycle values;

generating digital edge position values that specify desired timing of edges of the clock signal to impart spread spectrum modulation to the clock signal based on one or both of the time-varying digital period values and the time-varying digital duty cycle values; and supplying the digital edge position values to a waveform generation circuit having a digital input and which is driven by a reference clock, wherein said waveform generation circuit allows specification of each edge in an output waveform as a digital value supplied to said digital input that represents desired timing of each edge, wherein the output waveform produced by the waveform generation circuit is based on the digital edge position values and is the clock signal that exhibits the desired spectral characteristics.

15. A method for generating a clock signal having desired spectral characteristics, comprising:

generating time-varying digital period values that specify a period of time of a next edge relative to a previous edge of the clock signal and time-varying duty cycle values and anti-correlating the generation of the time-varying digital period values and the time-varying digital duty cycle values;

generating digital edge position values that specify desired timing of edges of the clock signal to impart spread spectrum modulation to the clock signal based on one or both of the time-varying digital period values and the time-varying digital duty cycle values; and supplying the digital edge position values to a waveform generation circuit having a digital input and which is driven by a reference clock, wherein said waveform generation circuit allows specification of each edge in an output waveform as a digital value supplied to said digital input that represents desired timing of each edge, wherein the output waveform produced by the waveform generation circuit is based on the digital edge position values and is the clock signal that exhibits the desired spectral characteristics.

16. A method for generating a clock signal having desired spectral characteristics, comprising:

generating digital edge position values that specify desired timing of edges of the clock signal, wherein the digital edge position values are generated from time-varying digital duty cycle values;

varying the digital duty cycle values so as to impart spread spectrum modulation to the clock signal; and supplying the digital edge position values to a waveform generation circuit having a digital input and which is driven by a reference clock, wherein said waveform generation circuit allows specification of each edge in an output waveform as a digital value supplied to said digital input that represents desired timing of each edge, wherein the output waveform produced by the waveform generation circuit is based on the digital edge position values and is the clock signal that exhibits the desired spectral characteristics.

17. The method of claim 16, wherein generating comprises generating the time-varying digital duty cycle value that varies according to a random pattern.

18. A method for generating a clock signal having desired spectral characteristics, comprising:

generating digital edge position values that specify desired timing of edges of the clock signal to impart spread spectrum modulation to secondary edges of the clock signal independently of any spread spectrum modulation imparted to primary edges of the clock signal, wherein generating comprises generating the digital edge position values to impart more spread spectrum modulation to secondary edges of the clock signal than to primary edges of the clock signal; and supplying the digital edge position values to a waveform generation circuit having a digital input and which is driven by a reference clock, wherein said waveform generation circuit allows specification of each edge in an output waveform as a digital value supplied to said digital input that represents desired timing of each edge, wherein the output waveform produced by the waveform generation circuit is based on the digital edge position values and is the clock signal that exhibits the desired spectral characteristics.

19. A method for generating a clock signal having desired spectral characteristics, comprising:

generating digital edge position values that specify desired timing of edges of the clock signal to impart spread spectrum modulation to secondary edges of the clock signal independently of any spread spectrum modulation imparted to primary edges of the clock signal, wherein generating comprises generating the digital edge position values so as to impart spread spectrum modulation to secondary edges of the clock signal and to impart no spread spectrum modulation to primary edges of the clock signal; and supplying the digital edge position values to a waveform generation circuit having a digital input and which is driven by a reference clock, wherein said waveform generation circuit allows specification of each edge in an output waveform as a digital value supplied to said digital input that represents desired timing of each edge, wherein the output waveform produced by the waveform generation circuit is based on the digital edge position values and is the clock signal that exhibits the desired spectral characteristics.

20. A method for generating a clock signal having desired spectral characteristics, comprising:

generating digital edge position values that specify desired timing of edges of the clock signal to impart spread spectrum modulation to the clock signal; and supplying the digital edge position values to a waveform generation circuit having a digital input and which is driven by a reference clock, wherein said waveform generation circuit allows specification of each edge in an output waveform as a digital value supplied to said digital input that represents desired timing of each edge, wherein the output waveform produced by the waveform generation circuit is based on the digital edge position values and is the clock signal that exhibits the desired spectral characteristics;

wherein generating comprises generating the digital edge position values such that secondary edges of the clock signal are placed midway between adjacent primary edges of the clock signal.

21. A method for generating a clock signal having desired spectral characteristics, comprising:

generating digital edge position values that specify desired timing of edges of the clock signal to impart spread spectrum modulation to the clock signal; and supplying the digital edge position values to a waveform generation circuit having a digital input and which is driven by a reference clock, wherein said waveform generation circuit allows specification of each edge in an output waveform as a digital value supplied to said digital input that represents desired timing of each edge, wherein the output waveform produced by the waveform generation circuit is based on the digital edge position values and is the clock signal that exhibits the desired spectral characteristics;

wherein generating comprises generating the digital edge position values for the waveform generation circuit to produce at least first and second clock signals that are correlated and are spread spectrum modulated differently.

22. The method of claim 21, wherein generating comprises generating the waveform generation edge position values for the digital circuit to produce the first clock signal having a greater frequency than a frequency of the second clock signal.

23. The method of claim 22, wherein generating comprises generating the waveform generation edge position values for the digital circuit to produce the first clock signal having spread spectrum modulation imposed on edges that occur between successive rising edges or successive falling edges of the second clock signal, and no spread spectrum modulation on the first clock signal for edges that coincide with the successive rising edges or successive falling edges of the second clock signal.

24. A method for generating a clock signal having desired spectral characteristics, comprising:

generating digital edge position values that specify desired timing of edges of the clock signal to impart spread spectrum modulation to the clock signal; and supplying the digital edge position values to a waveform generation circuit having a digital input and which is driven by a reference clock, wherein said waveform generation circuit allows specification of each edge in an output waveform as a digital value supplied to said digital input that represents desired timing of each edge, wherein the output waveform produced by the waveform generation circuit is based on the digital edge position values and is the clock signal that exhibits the desired spectral characteristics;

wherein generating comprises generating the digital edge position values for the waveform generation circuit so as to impart spread spectrum modulation imposed on some but not all edges of the clock signal.

25. A method for generating a clock signal having desired spectral characteristics, wherein the clock signal comprises primary and secondary edges, the method comprising:

generating the primary and the secondary edges of the clock signal so as to impart spread spectrum modulation to the secondary edges independently of any spread spectrum modulation imparted to the primary edges, wherein generating comprises generating the primary edges and the secondary edges of the clock signal to impart more spread spectrum modulation to the secondary edges than to the primary edges.

26. A method for generating a clock signal having desired spectral characteristics, wherein the clock signal comprises primary and secondary edges, the method comprising:

generating the primary and the secondary edges of the clock signal so as to impart spread spectrum modulation to the secondary edges independently of any spread spectrum modulation imparted to the primary edges, wherein generating edges comprises generating the primary edges and the secondary edges of the clock signal so as to impart spread spectrum modulation to the secondary edges and to impart no spread spectrum modulation to the primary edges.

27. A method for generating a clock signal having desired spectral characteristics, wherein the clock signal comprises primary and secondary edges, the method comprising:

generating primary and secondary edges of the clock signal so as to impart spread spectrum modulation to the secondary edges independently of any spread spectrum modulation imparted to the primary edges, wherein generating comprises generating digital values representing a time-varying period and a time-varying duty cycle of the clock signal, and generating edge positions from the digital values so as to impart the spread spectrum modulation to the clock signal.

28. A system for generating a clock signal having spread spectrum modulation, comprising:

a modulator circuit that generates digital edge position values that specify desired timing of edges of the clock signal; and a waveform synthesizer circuit coupled to the modulator circuit, wherein the waveform synthesizer circuit comprises a digital input and is driven by a reference clock, wherein the waveform synthesizer circuit allows specification of each edge in an output waveform as a digital value supplied to said digital input that represents desired timing of each edge, and based on the digital edge position values, generates edges of the clock signal so as to impart spread spectrum modulation to the clock signal, wherein the waveform synthesizer circuit generates each primary edge of the clock signal such that resulting primary-edge to primary-edge periods of the clock signal form a triangle pattern when plotted against time.

29. The system of claim 28, wherein the modulator circuit stores adjustable parameters representing a duration and slope of each side of the triangle pattern.

30. A system for generating a clock signal having spread spectrum modulation, comprising:

a modulator circuit that generates digital edge position values that specify desired timing of edges of the clock signal; and a waveform synthesizer circuit coupled to the modulator circuit, wherein the waveform synthesizer circuit comprises a digital input and is driven by a reference clock, wherein the waveform synthesizer circuit allows specification of each edge in an output waveform as a digital value supplied to said digital input that represents desired timing of each edge, and based on the digital edge position values, generates edges of the clock signal so as to impart spread spectrum modulation to the clock signal;

wherein the modulator circuit generates a time-varying digital period value specifying a period of time of a next edge relative to a previous edge of the clock signal, and generates the digital edge position values from the time-varying digital period value.

31. The system of claim 30, wherein the modulator circuit comprises a first adder that increments up or down a period offset value that is used to update the time-varying digital period value for a prior clock cycle, and a second adder that adds the period offset value to a time-varying digital period value representing the period at a prior clock cycle.

32. The system of claim 30, wherein the modulator circuit further comprises a digital circuit coupled to first adder to receive and randomly or pseudo-randomly change the period offset value.

33. The system of claim 30, wherein the modulator circuit further comprises a first register to store a value representing a number of output period steps for each leg of a triangle modulation pattern, and a second register to store a period increment value representing an amount the period offset value is incremented up or down.

34. The system of claim 33, wherein the modulator circuit further comprises a third register to store a minimum period value representing a minimum value allowed for the time-varying digital period value.

35. The system of claim 30, wherein the modulator circuit further comprises a lookup table storing period increment values describing each step of a near-triangle modulation pattern.

36. The system of claim 30, wherein the modulator circuit varies the time-varying digital period value to impart a desired frequency spectrum in the clock signal produced by the waveform synthesizer circuit.

37. The system of claim 30, wherein the modulator circuit generates the time-varying digital period value to vary according to a random or pseudo-random pattern.

38. The system of claim 30, wherein the modulator circuit further generates a time-varying digital duty cycle value, and generates the digital edge position values from the time-varying digital period value and the time-varying digital duty cycle value.

39. The system of claim 38, wherein the modulator circuit generates the time-varying digital period values and the time-varying digital duty cycle values so as to impart spread spectrum modulation to primary edges independent from modulation imparted to secondary edges of the clock signal.

40. A system for generating a clock signal having spread spectrum modulation, comprising:
a modulator circuit that generates digital edge position values that specify desired timing of edges of the clock signal; and
a waveform synthesizer circuit coupled to the modulator circuit, wherein the waveform synthesizer circuit comprises a digital input and is driven by a reference clock, wherein the waveform synthesizer circuit allows specification of each edge in an output waveform as a digital value supplied to said digital input that represents desired timing of each edge, and based on the digital edge position values, generates edges of the clock signal so as to impart spread spectrum modulation to the clock signal;
wherein the modulator circuit generates the digital edge position values such that the resulting spread spectrum modulation of the clock signal varies rapidly around to an average frequency of the clock signal.

41. A system for generating a clock signal having spread spectrum modulation, comprising:
a modulator circuit that generates digital edge position values that specify desired timing of edges of the clock signal; and
a waveform synthesizer circuit coupled to the modulator circuit, wherein the waveform synthesizer circuit comprises a digital input and is driven by a reference clock, wherein the waveform synthesizer circuit allows specification of each edge in an output waveform as a digital value supplied to said digital input that represents desired timing of each edge, and based on the digital edge position values, generates edges of the clock signal so as to impart spread spectrum modulation to the clock signal, wherein the waveform synthesizer circuit generates primary edges of the clock signal independent from secondary edges, and wherein the modulator circuit generates the digital edge position values to impart spread spectrum modulation to the secondary edges independently of any spread spectrum modulation imparted to the primary edges.

42. The system of claim 41, wherein the modulator circuit generates digital edge position values to impart more spread spectrum to secondary edges than to primary edges.

43. The system of claim 41, wherein the modulator circuit generates digital edge position values to impart spread spectrum modulation to secondary edges and to impart no spread spectrum modulation to primary edges.

44. The system of claim 41, wherein the modulator circuit generates a time-varying digital duty cycle value that varies according to a random or pseudo-random pattern.

45. A modulator circuit for producing digital values used in a clock signal generating system, comprising:
a) a first circuit that generates a time-varying digital period value;
b) a second circuit that generates a time-varying digital duty-cycle value;
c) a digital integrator circuit coupled to the first and second circuits, wherein the integrator circuit outputs digital edge position values based on at least one of the time-varying digital period value and the time-varying digital duty-cycle value, wherein the digital edge position values specify edge positions of the clock signal.

46. The modulator circuit of claim 45, and further comprising a multiplier circuit coupled to the outputs of the first and second circuits that multiplies the time-varying digital period value with the time-varying digital duty-cycle value to produce a value representing a time duration that the clock signal is to be high, and a subtraction circuit coupled to the output of the first circuit to subtract the value output by the multiplier circuit from the time-varying period value to produce a value representing a time duration that the clock signal is to be low.

47. A clock signal generating system comprising the modulator circuit of claim 45, and further comprising a digital waveform synthesizer circuit connected to the modulator circuit, wherein the digital waveform synthesizer circuit comprises a digital input and generates edges of the clock signal based on the digital edge position values supplied to said digital input so as to impart spread spectrum modulation to the clock signal.

* * * * *